United States Patent Office 3,306,827
Patented Feb. 28, 1967

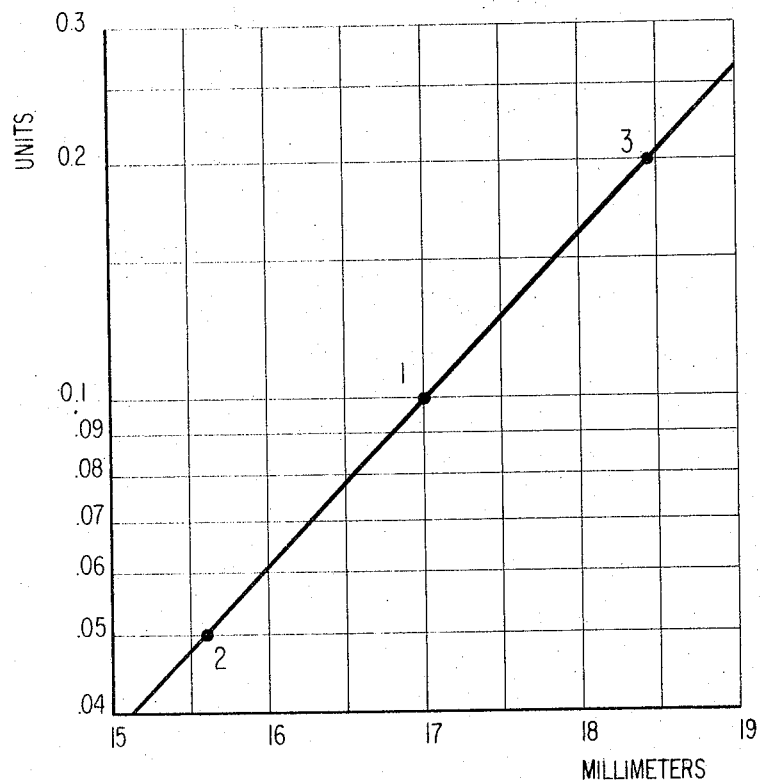

3,306,827
ASSAY FOR BACITRACIN IN FEED
George H. Craig, Terre Haute, Ind., assignor to Commercial Solvents Corporation, a corporation of Maryland
Filed Sept. 27, 1963, Ser. No. 312,231
3 Claims. (Cl. 195—103.5)

This application is a continuation-in-part of application Serial No. 96,525, filed March 17, 1961, and now abandoned.

The present invention relates to a process for separation from, and quantitative determination of, the bacitracin in a nutritious substance containing bacitracin and more particularly, to a process for the separation of small amounts of bacitracin and bacitracin salts from animal feed substances and an accurate quantitative determination of the small amounts of bacitracin and bacitracin salts, such as zinc bacitracin, manganese bacitracin and the like, in the animal feed substances.

Bacitracin, a well-known antibiotic, and its metal salts have found wide acceptance as additives in animal feed supplements. These additives have shown effectiveness in promoting growth and increasing feed efficiency in animals when incorporated in feeds in concentrations as low as four parts per million. In order that specifications of feed containing such small amounts of bacitracin can be verified, it is necessary to have methods which accurately determine the amount of bacitracin in the feed even in extremely low concentrations. Previous procedures have allowed accurate determinations of bacitracin in feeds when the bacitracin is present in amounts as low as 100 to 200 parts per million.

The present discovery is a process whereby a high degree of separation of, and the amount of, bacitracin in nutritious substances, e.g. animal feed, can be determined even when amounts as low as four parts per million are present in the feed. Although the invention will be set forth referring to "bacitracin," the salts of bacitracin are also contemplated.

Generally, the process of the present invention comprises first recovering or separating bacitracin from the feed for later quantitative determination by dehydrating the bacitracin-containing feed by treatment of the feed with a liquid dehydrating agent, e.g. acetone, in which the bacitracin is insoluble but in which fats are soluble to remove water as well as fats from the feed, separating the dehydrating agent, e.g. acetone, from bacitracin-containing feed, adjustment of the pH of the dehydrating agent-treated, e.g. acetone-treated, bacitracin-containing feed downward to about 2 with a weak acid, e.g. weak hydrochloric acid, extracting the bacitracin from the feed with aqueous buffered pyridine, treating the extracted bacitracin with a solvent, e.g. methanol, selective for bacitracin which will also precipitate interfering proteins, removal of solids from the extracted material, and drying the thus treated bacitracin. The thus recovered bacitracin is then prepared for quantitative determination by dissolving the dried material in a pH of about 6.5 phosphate ion buffer solution consisting essentially of about 22.1 to 22.2 parts of $K_2HPO_4$, about 27.8 to 27.9 parts of $KH_2PO_4$, and about 1.000 parts of water, all parts by weight, and adjusting the pH of the extract to 6.5 with sodium hydroxide. The amount of the thus extracted bacitracin can then be determined quantitatively by comparing the degree of inhibition of growth of the organism *Micrococcus flavus* treated with the unknown amount of recovered material with the degree of inhibition of growth produced by a known amount of bacitracin.

More particularly, in carrying out the dehydration step of the present process, it is preferred that about 200 to 300 ml. of acetone be used for each 50 grams of feed treated in dehydrating the nutritious substance, e.g. animal feed. In separating the acetone from the bacitracin-containing feed, the material is preferably first centrifuged, and the excess acetone is decanted. The substantially acetone-free bacitracin-containing feed is thereafter dried, preferably at a temperature ranging from about 20 to about 37° C. The amount of acetone used can vary depending upon the type of feed, and its moisture and fat content but in any event, it is advantageous to use an amount sufficient to substantially dehydrate and remove fats from the nutritious substance, e.g. animal feed. Although acetone is preferred and the invention will be described hereinafter using acetone as the dehydrating, and advantageously fat-removing, agent, it will be obvious to those versed in the art that the present process is not limited to the use of acetone. Other dehydrating agents, for instance petroleum ethers, may be used.

The dehydration step of the present process is not essential if the feed is low in fat and moisture content. For instance, if the feed has a fat content generally from about 2 to 10 or more percent by weight and/or a moisture content in excess of about 8 percent by weight, the dehydration step is advantageously employed to substantially reduce the moisture content to less than about 8 percent or to substantially reduce the fat content to less than about 2 percent. Examples of fats which can be present in feeds include beef tallow, lard, corn oil, peanut oil, soya bean oil and hydrogenated vegetable and animal fats, alone or in combination.

In adjusting the pH of the moisture-extracted, bacitracin-containing feed, it is generally adjusted to a pH in the range of about 1.8 to about 3.0, preferably a pH from about 2.0 to 2.2 or 2.5 to provide for better separation. It can be adjusted with a weak mineral acid, such as hydrochloric acid for instance, or acetic acid. Although other than hydrochloric acid can be used, the invention will hereinafter be set forth using hydrochloric acid to adjust pH. Adjustment of the pH is important to provide for complete separation of the bacitracin from the metal ion and recovery of the bacitracin. At a pH of 3.0, for example, approximately 15% of the bacitracin can be lost. For each 50 grams of starting feed material, about 70 ml. of hydrochloric acid, 0.3 to 0.4 N, are preferably used.

In extracting the bacitracin from the thus treated feed material with pyridine, it is preferred that about 70 milliliters of about 40% aqueous solution of pyridine containing about 1 to 3% of the pH 6.5 buffer previously mentioned be utilized for each 50 grams of starting feed material. The bacitracin-containing pyridine extract is preferably separated by centrifugation from the bacitracin extracted feed material and a minor measured portion of extract is separated from the major amount of extract.

This measured amount of bacitracin-containing pyridine extract is thereafter treated with a solvent for the bacitracin. Methanol is the preferred solvent since it will precipitate or coagulate undesirable proteins, the bacitracin is soluble in it and it can be advantageously separated, e.g. evaporated from the bacitracin it extracts. However, any solvent which will coagulate the interfering protein material and at the same time not interfere with the separating procedure may be used. The present process will hereafter be set forth using methanol as the solvent although its equivalents can be used. Additionally, a solvent that can be evaporated is preferred since otherwise additional impurities may be added to the bacitracin in recovering it from the solvent which deleteriously affect the determination of the amount of bacitracin in the feed material. Also, removal of the impurities would require additional operating steps, would lose bacitracin and reduce the efficiency of the process for separating bacitracin.

It is generally preferable in treating the measured amount of extract to utilize about 6 to 10 ml., 12 ml. or more of methanol for each 10 ml. of measured extract in order to obtain complete coagulation of interfering protein material. The methanol treated extract is then separated from the coagulated material and a measured portion of methanol-treated, bacitracin-containing pyridine extract is then advantageously separated and subjected to aeration until dry to substantially remove the methanol and pyridine. It is advantageous to remove the methanol and pyridine since they would produce zones of inhibition of organism growth on the agar plates subsequently utilized and described infra. Methanol and pyridine in the extract are miscible and bacitracin is soluble in each of them, however, the methanol functions to advantageously precipitate or coagulate the undesirable protein material from the pyridine solution.

The dried residue is thereafter dissolved in the previously mentioned pH 6.5 buffer preferably using about 5 to 7 ml. of buffer material for every 10 ml. of the measured portion of extract separated from the pyridine treatment. The pH of the buffer-treated material is then adjusted to 6.5 ($\pm 0.05$) with a suitable base preferably 1 N NaOH.

The amount of bacitracin present in the thus treated material can then be determined by any convenient microbiological assay method such as the procedure described on pages 15, 16 and 78 of Assay Methods of Antibiotics, by D. C. Grove and W. A. Randall, 1955, Medical Encyclopedia Incorporated, New York, New York. It is generally preferred, however, to first prepare a diluent containing no bacitracin in the manner previously described herein for bacitracin-containing feed. To the diluent is then added a known amount of bacitracin and standard dilutions are made. Both the standard material and the unknown material are then placed on agar plates on which the organism *Micrococcus flavus* is growing. The Grove and Randall method uses an agar plate containing a lower base layer of about 10 ml. of agar on which is provided an upper layer of about 4 ml. of agar seeded with the assay organism. Instead of using this double layer, I have found it advantageous to use a single layer of about 10 ml. of agar on the same plate which is about 90 mm. in diameter. It is advantageous to use the single layer since as low as 0.015 units per ml. of bacitracin can be assayed in a more expeditious manner.

The organism is then incubated on the agar plates for a period of about 18 hours at a temperature of about 35 to 37° C. and at the end of the incubation period the zones of growth inhibition of the standard material and the unknown are then compared. From this comparison a determination of the amount of bacitracin in the unknown material is made.

It is, therefore, an object of the present invention to provide a new and novel method for the separation and recovery of small quantities of bacitracin, as small as four parts per million, from nutritious substances, e.g. feed materials. It is a further object of the present invention to provide a process for a simple and accurate quantitative determination of very small amounts of bacitracin and bacitracin salts in animal feed substances.

Other objects and features of the present invention will become apparent from the attached drawing, wherein the single figure represents a standard curve graph described in detail hereinbelow, and from the detailed procedure set forth hereinbelow which is illustrative of an entire separation and quantitative determination process for bacitracin in small amounts in feed; but, it is not intended that the invention be limited to the amounts, order of procedure, or specific ingredients set forth.

*Example I*

Four 50-gram portions of an animal feed containing 4.14 grams per ton of bacitracin were each separately treated as follows: A 50-gram portion was placed in a 250 ml. bottle, to the bottle were added 100 ml. of acetone and the thus formed mixture was thoroughly agitated for about one minute; particles adhering to the side of the bottle were washed down with additional acetone and the mixture was centrifuged for approximately two minutes at 1,500 r.p.m. The excess acetone was then removed from the feed material by decantation and the acetone treatment was repeated. After the second acetone treatment, the feed was allowed to dry at room temperature for about 12 hours. To the dried material were then added 70 ml. of 0.37 N hydrochloric acid, and the resulting mixture was then thoroughly stirred. To the mixture were then added 70 ml. of 40 percent aqueous pyridine to which had been previously added 1.5% of a buffer having the following composition: 22.15 parts of $K_2HPO_4$, 27.85 parts of $KH_2PO_4$, and 1,000 parts of water, all parts by weight. The pyridine-treated material was then thoroughly agitated for about five minutes and then centrifuged for about ten minutes at 2,200 to 2,500 r.p.m. Ten ml. of the supernate from the centrifuged material were then transferred to a 50 ml. centrifuge tube, 7 ml. of methanol were added thereto and the resulting mixture was thoroughly agitated. The mixture was then allowed to stand for about five minutes to permit maximum coagulation of protein material and then centrifuged at 1,500 r.p.m. for above five minutes. Fifteen ml. of the supernate from the centrifuged material were then transferred to a pour-lip equipped Petri dish and dried by aeration (approximately one hour) using a U-shaped, or a double-lined, U-shaped, air sparger which consisted of a ¼ inch diameter aluminum tube bent at the mid-point having 1/16 inch drill holes spaced 3¾ inches apart. To the dried material were then added 3 ml. of previously described pH 6.5 buffer and the thus formed mixture was thoroughly stirred. The mixture was then transferred to a 25 ml. of graduated cylinder and the dish was washed with 4 ml. of buffer material and the washings were added to the graduated cylinder. The material in the graduated cylinder was then adjusted to a pH of 6.5 ($\pm 0.05$) with 1.4 ml. 1 N NaOH. To the thus adjusted material was then added enough buffer to make a total of 10 ml. in the graduated cylinder. The 10 ml. of material were then transferred to a 15 ml. centrifuge tube and centrifuged at about 2,000 r.p.m. for five minutes. The thus treated four feed portions containing bacitracin are then ready for growth inhibition testing. Seven 50-gram feed portions containing no bacitracin were treated by the procedure specified above for the four portions containing bacitracin. These seven portions were combined and then separated into seven portions. From three of the portions dilutions were prepared, the first containing 0.05 unit per milliliter of bacitracin, and the second containing 0.1 unit per milliliter of bacitracin, and the third containing 0.2 unit per milliliter of bacitracin. A standard curve is then determined by preparing eight agar plates on which the organism *Micrococcus flavus* is growing. On each of four of the agar plates six assay cups were placed and in half of the cups an equal portion of 0.05 standard was placed and in the other half of the cups an equal portion of 0.1 standard was placed. The same procedure was repeated with the remaining four plates with the exception that the 0.2 unit per milliliter standard was used instead of the 0.05 unit per milliliter standard. All eight plates were then incubated for 18 hours at 37° C. and the average of the zones of growth inhibition were determined to the nearest 0.01 mm. although the individual zones were determined to the nearest 0.1 mm. The average reading for the twelve 0.05 unit per milliliter standards in the first group of four plates was 15.60 mm. while the corresponding average reading for the twelve 0.1 unit per milliliter standards was 17.01. The average reading for the twelve 0.2 unit per milliliter standards in the second group of four plates was 18.43 while the corresponding average reading for the twelve 0.1 unit per milliliter standards was 17.03. The average of the twenty-four readings of the 0.1 unit per milliliter standards was 17.02.

A standard curve graph, as illustrated by the sole figure, is obtained by plotting this 17.02 reading, represented by point 1 in the figure. The figure is a two-cycle semilog paper using the concentration in units per milliliter as the ordinant and the diameter of the zone of inhibition as the abscissa. The corrected value for the 0.05 standard was determined by adding the difference between the corresponding twelve 0.1 unit per milliliter standards and the average of the total twenty-four 0.1 unit per milliliter standard readings to give a reading of 15.61 which is denoted as point 2. The average reading for the 0.2 unit per milliliter standards was corrected in a like manner except that the reading was corrected downward to 18.42 which is represented in the figure as point 3. The best straight line between these three points represents a standard curve.

Each of the four unknowns were then separately tested as follows: Four new 0.1 unit per milliliter standards were prepared from the remaining four dilutions not containing bacitracin. A portion of each standard was then tested for growth inhibition along with the unknown on four assay plates using three cups on each plate for the standard and three cups on each plate for the unknown in the manner described for the original standard. On the first of the four plates the standard produced a growth inhibition of 17.84 mm. while the unknown produced a growth inhibition of 16.65 mm., a difference of −1.19 mm. By subtracting 1.19 from the value shown by point 1, a potency of .056 unit per milliliter is shown. The values of the other three unknown samples are shown in Table I along with the values for the first sample.

TABLE I

| Sample | 0.1 unit standard average, mm. | Sample average, mm. | Difference, mm. | Unit per ml. | Grams per ton |
|---|---|---|---|---|---|
| 4.14 g/t | 17.84 | 16.65 | −1.19 | 0.056 | 3.84 |
| 4.14 g/t | 17.60 | 16.48 | −1.12 | 0.057 | 3.91 |
| 4.14 g/t | 17.79 | 16.66 | −1.13 | 0.057 | 3.91 |
| 4.14 g/t | 17.56 | 16.47 | −1.09 | 0.057 | 3.91 |
| Mean | | | | | 3.89 |

The total assay procedure indicates that 3.89 grams of bacitracin were present in the feed sample (94% theory).

*Example II*

10 grams sample of a feed containing 20 grams of bacitracin per ton of feed is placed in a 150 ml. beaker. 25 ml. of 0.37 N HCl is added and the mixture is stirred. 25 ml. of a 40% pyridine-buffer solution is added and the solution is stirred occasionally for 5 minutes. The mixture is centrifugalized at 1800 r.p.m. for 5 minutes. 15 ml. of supernate is transferred to a 50 ml. round bottom centrifuge tube. 15 ml. of methanol is added and stirred. The mixture is centrifugalized for 2 to 3 minutes.

To each of two Petri dish bottoms (with pour lips) are added 10 ml. aliquots of the supernate, and the contents are dried under an air sparger. One of the aliquots is used to determine the volume of 1 N NaOH needed to adjust pH to 6.5. This is done by adding 4 ml. of pH 6.5 buffer to the dry sample and rubbing contents with a neoprene policeman followed by addition of the NaOH in 0.1 ml. volume until adjusted. (The volume required to adjust most samples ranges between 0.3 to 1.0 ml. of 1 N NaOH.) 3 ml. of pH 6.5 buffer is added to the other dish, followed by the required volume of NaOH. The contents are stirred with a neoprene policeman and carefully transferred to a 25 ml. glass-stoppered graduated cylinder. The Petri dish is washed with two 2 ml. portions of pH 6.5 buffer and washings are added to the sample in the graduated cylinder which is diluted to the 10 ml. mark with buffer, and is assayed against a 0.1 u./ml. bacitracin standard in the pH 6.5 buffer. Points of the standard curve in buffer should be set at 0.025 u./ml., 0.05 u./ml., and 0.200 u./ml. (It is not necessary to prepare blank extractables for use in the standard and standard curves. It has been found that curves and standards prepared in buffer alone are similar to those prepared with the more dilute higher level extractables.)

The amount of bacitracin can be calculated by determining u./ml. concentration of the sample extract. The total dilution of the 10 gram sample is 100, or 1 to 10. To change units of bacitracin per gram to grams per ton multiply by 21.619. Thus the complete formula is u./ml.×10×21.619.

What is claimed is:
1. A process for determination of small quantitative amounts of bacitracin in animal feeds which consists essentially of dehydrating the bacitracin-containing feed with acetone, adjusting the pH of the acetone-treated feed to about 2.0 with weak hydrochloric acid, substantially completely extracting bacitracin from the feed with a 40% aqueous pyridine solution containing about 1 to 3% of a buffer having the following composition: 22.1 to 22.2 parts of $K_2HPO_4$, 27.8 to 27.9 parts of $KH_2PO_4$ and about 1,000 parts of water, all parts by weight, to form a bacitracin-containing pyridine extract, separating the bacitracin-containing extract from the feed, further separating a measured portion of extract from the already feed-separated extract, treating the measured amount of separated extract with methanol to coagulate protein material, separating the methanol-treated extract from said coagulated material, drying the resultant extract material by aeration, dissolving the dried material in a phosphate ion buffer material, adjusting the pH of the buffered material to 6.5 (±0.05) and determining the amount of bacitracin therein.

2. A process for low level determination of quantitative amounts of bacitracin in animal feeds which consists of dehydrating the bacitracin-containing feed by treatment with acetone, adjusting the pH of the thus acetone-treated feed to about 2.0 to 2.2 with weak hydrochloric acid, the acid being employed in amounts of about 70 ml. per 50 grams of feed treated, substantially completely extracting bacitracin from the feed with a 40% aqueous pyridine solution containing about 1 to 3% of a buffer having the following composition: 22.1–22.2 parts of $K_2HPO_4$, 27.8–27.9 parts of $KH_2PO_4$, and about 1,000 parts of water all parts by weight, the said buffered aqueous pyridine being employed in amounts of about 70 ml. of aqueous pyridine per 50 grams of feed treated to form a bacitracin-containing extract, separating the bacitracin-containing extract from the feed, further separating a measured portion of extract from the already feed separated extract, treating the measured amount of separated extract with from about 6 to 10 ml. of methanol for each 10 ml. of measured extract to coagulate protein material, separating the methanol-treated extract from said coagulated material, drying the resultant separated bacitracin-containing extract material by aeration, dissolving the dried bacitracin-containing extract in the said buffer, adjusting the pH of the extract to 6.5 (±0.05) and determining the amount of bacitracin therein.

3. A process for low level determination of quantitative amounts of bacitracin in animal feeds which consists of dehydrating the bacitracin-containing feed with acetone, adjusting the pH of the acetone-treated feed to about 2.0 with 0.3–0.4 N hydrochloric acid, the acid being employed in amounts of about 70 ml. per 50 grams of feed treated, substantially completely extracting bacitracine from the feed with a 40% aqueous pyridine solution containing about 1–3% of a buffer having the following composition: 22.1–22.2 parts of $K_2HPO_4$, 27.8–27.9 parts of $KH_2PO_4$, and about 1,000 parts of water, all parts by weight, the said buffered aqueous pyridine being employed in amounts of about 70 ml. of aqueous buffered pyridine per 50 grams of starting feed material to form a bacitracin-containing extract, separating the bacitracin-containing extract from the feed, further separating a measured portion of extract from the already feed separated extract, treating the measured amount of separated extract with from about 6–10 ml. of methanol for each 10 ml. of measured extract to coagulate protein material, separating the methanol-treated extract from said coagulated material, drying the resultant separated extract material by aeration, dissolving the dried material in from about 5–7 ml. of the said buffer material for each 10 ml. of the originally measured extract, adjusting the pH of the buffered material to 6.5 ($\pm 0.05$) with 1 N NaOH and determining the amount of bacitracin therein.

References Cited by the Examiner

UNITED STATES PATENTS

| | | | |
|---|---|---|---|
| 2,774,712 | 12/1956 | Baron | 99—2 |
| 3,025,216 | 3/1962 | Ziffer et al. | 99—2 |

OTHER REFERENCES

Federal Register, vol. 27, part 2, p. 13069, December 1962.

Grove et al.: Assay Methods of Antibiotics, pp. 80, 81, 222, Medical Encyclopedia, Inc., New York, N.Y. (1955).

Merck Index, 7th ed., pp. 7, 8, 117 Merck & Co. Inc., Rahway, N.J. (1960).

Peterson et al.: Elements of Food Biochemistry, pp. 137–8, Prentice-Hall, Inc., New York, N.Y. (1943).

Seiden: The Handbook of Feedstuffs, pp. 188, 189, Springer Pub. Co., Inc., New York, N.Y. (1957).

A. LOUIS MONACELL, *Primary Examiner.*

D. J. DONOVAN, *Assistant Examiner.*